US00RE38757E

(19) United States
(12) Reissued Patent
Wells et al.

(10) Patent Number: US RE38,757 E
(45) Date of Reissued Patent: Jul. 12, 2005

(54) AUTOMATIC MULTIPLE-DECANTING CENTRIFUGE AND CONTAINER THEREFOR

(75) Inventors: John R. Wells, deceased, late of Culver City, CA (US); by Lin A. Jakary, legal representative, La Jolla, CA (US); Steven M. Gann, Huntington Beach, CA (US)

(73) Assignee: Harvest Technologies Corporation, Plymouth, MA (US)

(21) Appl. No.: 09/482,653

(22) Filed: Jan. 13, 2000

Related U.S. Patent Documents

Reissue of:
(64) Patent No.: 5,707,331
Issued: Jan. 13, 1998
Appl. No.: 08/435,662
Filed: May 5, 1995

(51) Int. Cl.[7] ..... B04B 5/02; B65D 41/50
(52) U.S. Cl. ..... 494/20; 494/32; 220/501
(58) Field of Search ..... 494/13, 14, 16, 494/17, 20, 32, 33, 35, 85; 210/781, 782; 215/6; 422/102; 220/501, 507, 523, 554

(56) References Cited

U.S. PATENT DOCUMENTS 1,722,396 A * 7/1929 Reiber
3,164,186 A * 1/1965 Weber et al.
3,190,546 A * 6/1965 Raccuglia et al.
3,221,741 A * 12/1965 Le Veen
3,228,444 A * 1/1966 Weber et al.
3,235,069 A * 2/1966 Bennett et al.
3,420,437 A * 1/1969 Blum et al.
3,586,484 A * 6/1971 Anderson
3,642,163 A * 2/1972 McFarland
3,712,535 A * 1/1973 Genese et al.
3,722,789 A * 3/1973 Kennedy
3,727,788 A * 4/1973 Holbrook
3,774,455 A * 11/1973 Seidler et al.
3,851,817 A * 12/1974 Buck
3,859,671 A * 1/1975 Tomasello ..... 215/6
3,877,634 A * 4/1975 Rohde et al.
3,951,334 A * 4/1976 Fleming et al.
3,953,172 A * 4/1976 Shapiro et al.
4,026,433 A * 5/1977 Crippa ..... 215/6
4,066,407 A * 1/1978 Lupica
4,150,089 A * 4/1979 Linet ..... 422/102
4,285,463 A * 8/1981 Intengan
4,294,372 A * 10/1981 Onishi
4,431,423 A * 2/1984 Weyant, Jr.
4,714,457 A * 12/1987 Alterbaum
4,932,546 A * 6/1990 Stannard
5,045,047 A * 9/1991 Hutchins et al.
5,047,004 A * 9/1991 Wells
5,178,602 A * 1/1993 Wells
5,199,937 A * 4/1993 Wada et al.
5,209,776 A * 5/1993 Bass et al.
5,292,362 A * 3/1994 Bass et al.
5,318,524 A * 6/1994 Morse et al.
5,447,245 A * 9/1995 Merhar ..... 215/6
5,503,284 A * 4/1996 Li ..... 220/501

FOREIGN PATENT DOCUMENTS

CA 461698 * 12/1949 ..... 220/523
DE 4323844 * 12/1949
DE 43 23 844 A1 * 7/1993
FR 936560 * 7/1948 ..... 220/501

* cited by examiner

*Primary Examiner*—Charles E. Cooley
(74) *Attorney, Agent, or Firm*—Clark & Brody

(57) ABSTRACT

A centrifuge is capable of holding a sample container in selected orientations, either during or after centrifugation, to drain supernatants between two or more chambers of the container. The draining may be gravity or centrifugal draining. This allows an automated process to subject a sample to a first physical or chemical treatment to produce a first supernatant, the first supernatant to be subjected to a second physical or chemical treatment, and a second supernatant to be separated from a desired component.

36 Claims, 3 Drawing Sheets

AUTOMATIC MULTIPLE-DECANTING CENTRIFUGE AND CONTAINER THEREFOR

Matter enclosed in heavy brackets [ ] appears in the original patent but forms no part of this reissue specification; matter printed in italics indicates the additions made by reissue.

TECHNICAL FIELD

This invention relates to the art of automatic centrifugation. In particular, the invention relates to apparatus and procedures using automatic, multiple decanting with centrifugation. In a preferred embodiment, an automated procedure separates blood components and proteins including the separation of fibrinogen from blood.

BACKGROUND

The separation of components through centrifugation is well known. For example, in the medical field it is common to subject a sample of blood to centrifugation to produce a precipitate of cellular material and a supernatant of plasma. The plasma is then decanted to complete the separation of these components.

U.S. Pat. No. 5,178,602 (Wells) and U.S. Pat. No. 5,047,004 (Wells) show an automated centrifuge, which includes structure for holding a centrifuge tube, after centrifugation, in a position that allows the supernatant to drain from the tube and into another container by gravity. The holding structure shown in these patents comprises a locking mechanism mounted for axial movement with respect to the axis of rotation of the centrifuge. An electromagnet that is easily controlled causes the axial movement.

It is also known to decant a supernatant by the process of centrifugal draining. According to that process, a centrifuge rotates a centrifuge tube while the tube is held in a position such that the supernatant is drained from the tube by centrifugal forces.

Fibrin sealants for treating wounds are known and are typically produced by combining a fibrinogen/Factor XIII component with bovine thrombin. When these are mixed, a fibrin tissue adhesive results, which is applied to the wound. Descriptions of compositions for use as tissue sealants are given in U.S. Pat. No. 5,292,362 and U.S. Pat. No. 5,209,776 (Bass et al.). The fibrinogen is obtained from plasma, either pooled or autologous, and cryoprecipitation is one known technique for separating fibrinogen from plasma. One cryoprecipitation technique is described in U.S. Pat. No. 5,318,524 and includes the centrifugation of thawing plasma to produce a precipitate containing fibrinogen/Factor XIII. Other techniques for producing fibrinogen/Factor XIII include inducing precipitation of the component by addition of such agents as Ammonium Sulfate or polyethylene glycol (PEG) to blood plasma.

SUMMARY OF THE INVENTION

Several known chemical procedures include repeated steps of physical separation between two or more components. Separation based on density differences between the components is often by centrifugation, and the resulting supernatant is decanted to complete the separation. Each step provides an opportunity for error, which would be reduced by automation of the process.

In accordance with the invention, chemical procedures requiring several centrifugation steps are automated, to reduce the time required by a clinician and eliminate the potential for errors. Apparatus in accordance with the invention includes a multiple-chamber container and a centrifuge designed to receive the container and subject its contents to predetermined centrifugation steps as well as gravity and centrifugal decanting of the supernatant.

A preferred container in accordance with the invention includes first and second chambers separated by an intermediate wall. The first chamber is designed to receive a first liquid, such as human blood. The second chamber is located adjacent the first chamber, and the wall between the chambers is such that a supernatant in the first chamber will flow over the top of the wall and be drained into the second chamber by gravity when the container is held in the proper orientation. The supernatant in the second chamber may then be subjected to a mixing action and then may be subjected to a second centrifugation. The container can also be held in a second position whereby a second supernatant is caused to flow back over the wall into the first chamber by centrifugal forces resulting from a second centrifugation.

A centrifuge in accordance with the invention includes a rotatable support with a swinging frame for receiving the multiple-chamber container and means for locking the container in either of at least two positions for draining supernatant fluids from the chambers. Preferably, the locking means is an electro-magnetically operated disk mounted for movement axially with respect to the axis of rotation of the rotatable support. The centrifuge is preferably operated under the control of an electronic circuit, which may include a programmed array logic (PAL) or other circuitry, that causes the rotor to operate in accordance with a predetermined program and controls the locking means such that it locks the container in predetermined orientations in conjunction with operation of the rotor.

While many different programs for operation of the centrifuge can be developed, depending on the desired results, a preferred operation is for the production of autologous fibrinogen. Prior techniques for production of fibrinogen require several distinct steps, each of which requires a skilled technician but does not eliminate an opportunity for error. These steps include separation of plasma from cellular components, treatment of the plasma with a precipitating agent, and separation of a fibrinogen precipitate "pellet" from the plasma. The separation of plasma from blood and the separation of the fibrinogen pellet from plasma typically require centrifugation first of the blood and then of the plasma, with addition of at least one precipitating agent between the steps. Thus, the production of fibrinogen in the prior art has been complex and error-prone.

In accordance with this embodiment of the invention, a patient's anticoagulated blood is placed in the first chamber of the disposable container, and a precipitation agent is placed in the second of the chambers. The container is then placed in the swinging frame of the centrifuge, and the control circuit is activated to initiate the operation of the centrifuge. The centrifuge first rotates the container for a time period that has been determined to be adequate for separating the cellular components from the supernatant plasma. During this time, the swinging frame will have rotated outwardly substantially due to centrifugal forces on the container. While the frame is in the outwardly rotated position, the locking means is activated to lock it there. The rotation of the support is then terminated. As the rotational velocity of the support decreases, the supernatant fluid, being no longer subject to the centrifugal forces, flows out of the first chamber and into the second chamber by gravity. The cellular component is more viscous and, thus, flows toward the second chamber at a rate less than that of the plasma. Preferably, however, a divider in the form of a disk is placed in the first chamber to restrict the flow of the cellular components and plasma below the disk. The disk is at a depth that provides a predetermined volume of plasma, which is normally near the expected boundary between the supernatant and cellular components. After a period of time that has been determined to allow an adequate amount of the plasma to flow into the second chamber, the locking means is deactivated to release the container, whereby it assumes an upright position with the cellular component remaining in the first chamber and the plasma now in the second chamber. The rotatable support is then alternately activated and deactivated for short intervals to mix the plasma with the precipitating agent in the second chamber. Interaction between the precipitating agent and the plasma initiates precipitation of fibrinogen and Factor XIII from the plasma. The support is then again rotated to accelerate the precipitation of the fibrinogen/Factor XIII and to create a pellet in the bottom of the second chamber. As a final step, the locking means is again activated to lock the container in a position such that the supernatant resulting from precipitation of the fibrinogen is decanted by centrifugal draining into the first chamber. In this step, the container is held substantially upright, and the support is rotated to apply centrifugal forces to the supernatant, whereby it flows over the wall between the chambers and into the first chamber. The locking means is then inactivated, the container removed from the centrifuge, and the fibrinogen/Factor XIII removed from the second chamber for further processing. In a preferred embodiment, the fibrinogen/Factor XIII is reconstituted and then, combined with thrombin, and applied to a patient to treat a wound.

DETAILED DESCRIPTION OF THE INVENTION

Figure 1:
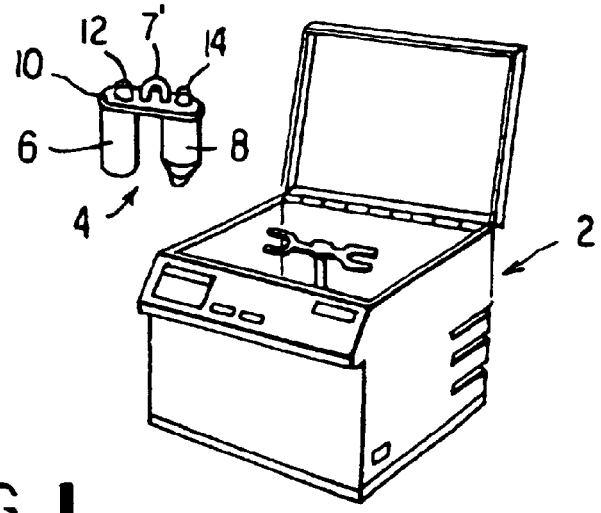
FIG. 1 is a perspective of a container and centrifuge in accordance with the invention.
Figure 2:
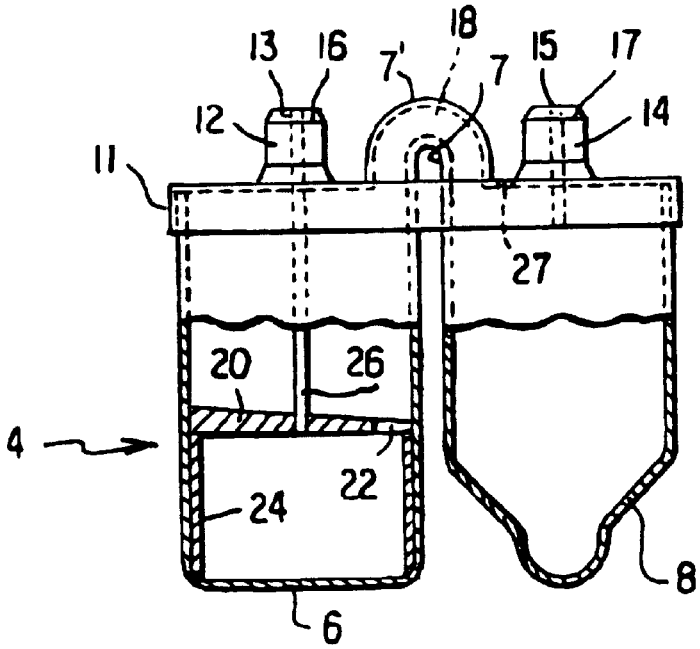
FIG. 2 is a vertical cross section of a preferred embodiment of a container.

With reference to FIGS. 1 and 2 of the drawings, a centrifuge 2 is designed to receive a container 4 in accordance with the invention. The centrifuge is capable of subjecting the container to a series of steps that will be described in detail below. The container includes at least two chambers, 6 and 8. Chamber 6 is designed to receive a first fluid to be treated, such as blood. Chamber 8 is designed to receive fluids that have been decanted from chamber 6, such as a supernatant plasma resulting from centrifugation of blood in chamber 6.

A preferred form of the container is shown in detail in FIG. 2. As shown, the container comprises three primary parts. A base part is preferably molded and includes the chambers 6 and 8 and a bridge 7, which connects the two chambers. A lid 11, also preferably molded, fits over the tops of the chambers to close them. The lid includes cup shaped extensions 12 and 14, each of which is centrally aligned with a respective one of the chambers 6 and 8. Extension 12 has a access port in the form of centrally located opening 13, while extension 14 has a centrally located opening 15. The openings receive syringe needles to permit fluids to be injected into the chambers or withdrawn therefrom. Membranes 16 and 17 cover the openings 13 and 15 to maintain sterility. The membranes are preferably heat sealed into the extensions 12 and 14 during construction by providing a cavity for receiving the membranes. After a membrane is inserted, the upper edges of the cavity are folded over and welded, e.g., ultrasonically, to retain the membrane.

The lid also includes a bridge T that cooperates with bridge 7 in the base to form a fluid channel 18, connecting chambers 6 and 8. As shown, the bridge 7 extends above the tops of the chambers 6 and 8 to prevent communication between the chambers by "splashing." Intentional fluid communication between the two chambers will be described in detail below.

A separation disk 20 is preferably placed in chamber 6 near, but always above, the expected vertical position of the boundary between supernatant plasma and cellular components after a first centrifugation of a blood sample. The hematocrit is known to vary among individuals, and the exact amount of plasma that will result from a blood sample cannot be accurately predicted without prior testing of the sample. Thus, disk 20 is located such that the plasma above the disk after centrifugation of a predetermined volume of blood is a predetermined volume of plasma. The upper surface of the disk 20 is tapered toward an edge, and the edge includes at least one groove 22 that allows fluid communication between the parts of the chamber 6 that are above and below the disk 20.

In a preferred embodiment, a cylindrical support 24 is attached to the lower surface of the disk to set the location of the disk during assembly.

A hollow tube 26 is provided to facilitate introduction of the blood sample to the portion of the chamber 6 that is below the disk 20. The tube 26 extends from just below the opening 13 through disk 20. Thus, a syringe needle inserted through opening 13 pierces membrane 16 and communicates with tube 26 to allow injection of the blood sample into the bottom of the chamber 6. The groove 22 permits downward movement of the plasma and cellular components during centrifugation but retards movement of the cellular components during decanting. Also, an air vent 27 is provided for chamber 8 to facilitate introduction and withdrawal of fluids.

In use, a container 4 is placed in a holder on the rotor of the centrifuge as indicated in FIG. 1. To balance the rotor, two such containers are preferably placed in the centrifuge in diametrically opposed positions. Of course, only one container may be used and a weight or "dummy" container used to balance the rotor.

Figure 3B:
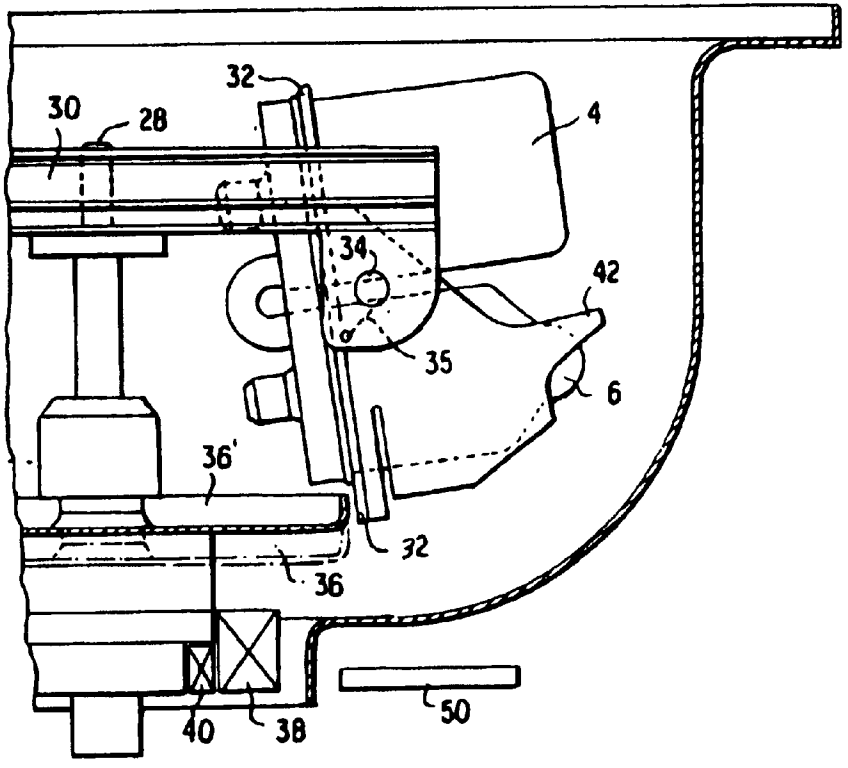
FIGS. 3a and 3b are partial vertical cross sections of the centrifuge of FIG. 1.
Figure 3A:
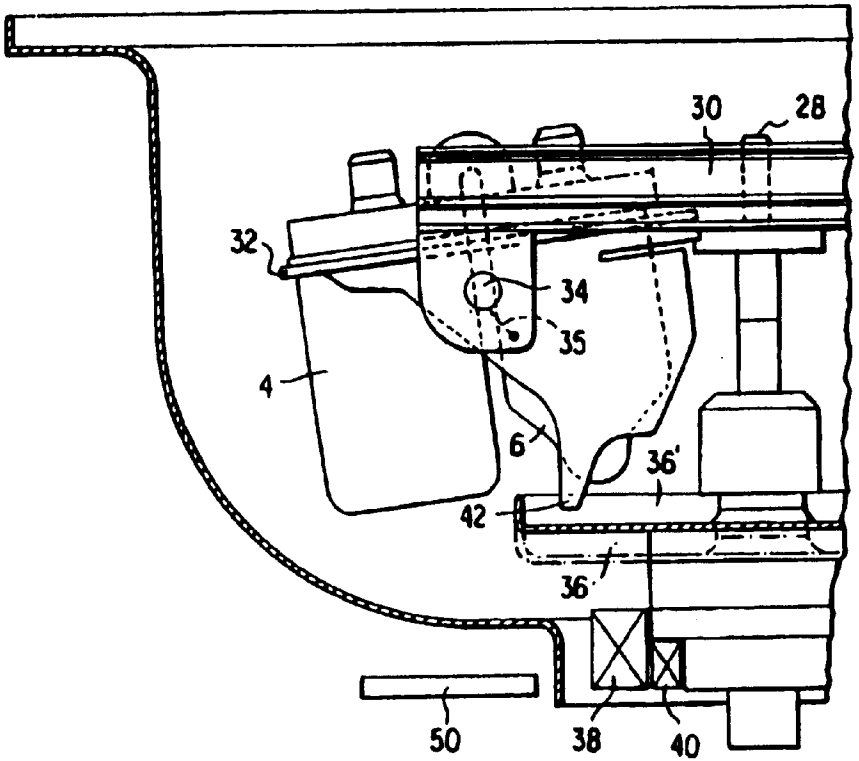

FIGS. 3a and 3b are partial cross sections of a preferred embodiment of a centrifuge showing the container locked in two different positions. A rotor shaft 28 is connected to a motor (not shown), which rotates the shaft. A rotor 30 is mounted to the shaft for rotation and has a frame 32 pivotally mounted to the rotor 30 at pivot connection 34. The top surface (not shown) of the frame 32 has two circular openings for receiving the chambers 6 and 8 whereby the container can be placed in the frame such that the contents of the container will be subjected to centrifugal forces as the rotor is rotated. A bias spring 35 ensures that the frame 32 will pivot to an upright position when centrifugation is terminated. The frame 32 may also be shaped to reduce wind resistance, as known in the art.

A locking plate 36 is mounted coaxially with the shaft 28 for engaging the frame 32 to lock the container in desired orientations. The plate and the mechanism for controlling the positions of the plate may be the substantially the same as that shown in my previous U.S. Pat. No. 5,178,602. For example, an electromagnet 38 may be provided to control the position of the locking plate by action on a permanent magnet 40, which is attached to the locking plate.

Preferably, the electromagnet 38 and magnet 40 are positioned such that the locking plate can be placed in either of two positions. In a first position, shown in phantom lines, the plate does not engage the frame 32, and the frame 32 is free to rotate about pivot 34. In a second position, shown in solid lines at 36', the locking plate engages one of two parts of the frame 32 to hold it in one of two selected orientations. In the position shown in FIG. 3a, a lip of the plate engages a protuberance 42 on the frame 32 to lock the container in the orientation shown in FIG. 3a. In the position shown in FIG. 3b, the plate 36 engages an upper edge of the frame 32 to lock the container in the tilted position shown in FIG. 3b. The locking plate preferably rotates with the rotor whereby it can be moved to engage the frame during centrifugation of the contents of the container.

The operation of the centrifuge in a preferred embodiment of the invention will be described with regard to FIGS. 4a through 4f. In a first step, blood is introduced into chamber 6 of the container through opening 13. The blood has preferably been obtained from a patient, but it may be pooled or obtained from another. A precipitating agent 43, e.g., PEG, is then placed in chamber 8, preferably by injection through opening 15. The container with blood and precipitating agent are then placed in the centrifuge for automated operation.

Figure 4A:
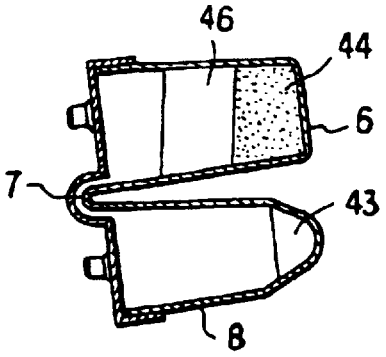
FIGS. 4a through 4f are schematic diagrams illustrating a preferred method of operation of the centrifuge of the invention.
Figure 4B:
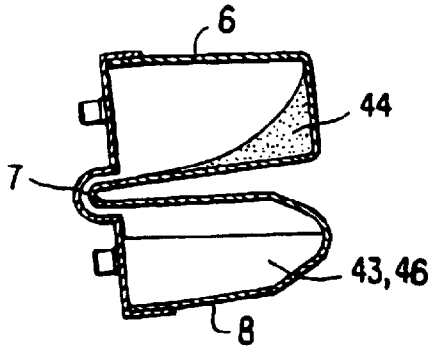
Figure 4C:
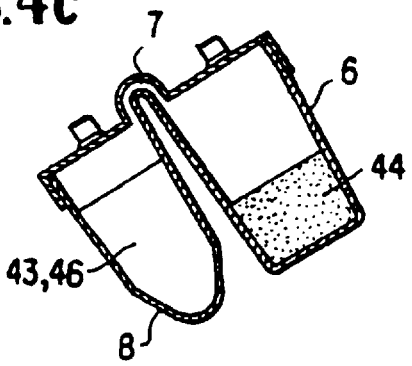
Figure 4D:
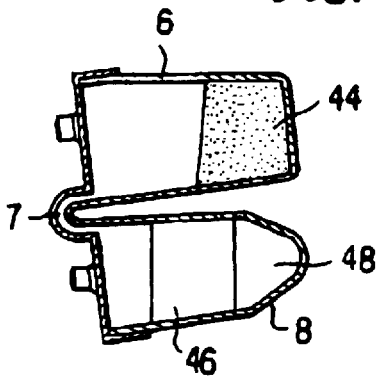

In the first step of automated operation, the container is allowed to swing freely as the blood is subjected to centrifugation. As illustrated in FIG. 4a, the cellular component 44 of the blood will be separated from the plasma component 46 in this step. After a predetermined time period, e.g., five minutes, the locking plate 36 is moved to a position shown at 36' whereby the container 4 is held in the position shown in FIGS. 3b and 4b, and rotation of the rotor is stopped. In this position, the plasma component 46 flows through channel 18 by the force of gravity. The chamber is held in the position of FIG. 4b for preferably about 3 seconds, which is adequate to allow the plasma to drain by gravity into the chamber 8 but is not so long that the more viscous cellular component 44 drains into the chamber 8. The plasma 46 and precipitating agent 43, which was previously placed in chamber 8, are now both in chamber 8. To provide complete mixing of these fluids, the locking plate is lowered, and the rotor is caused to accelerate and decelerate alternately for 10–20 seconds, as illustrated in FIG. 4c. The precipitating agent causes the fibrinogen/Factor XIII to separate from the plasma, and this separation is assisted by centrifuging the contents of the container a second time. This second centrifugation may be for a period of about five minutes. A fibrinogen pellet 48 is, thus, formed in the bottom of the chamber 8, as illustrated in FIG. 4d. At this stage of the process, the plasma supernatant 46 remains in chamber 8.

Figure 4E:
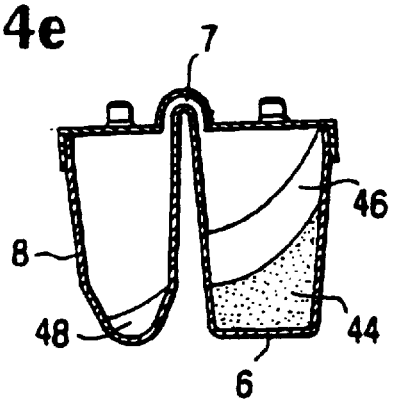
Figure 4F:
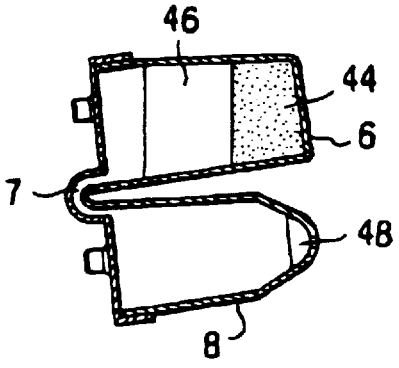

Plasma 46 is separated from the fibrinogen pellet 48 by stopping rotation of the centrifuge rotor to allow the container to pivot to the upright position shown in FIGS. 3a and 4e. The locking plate 36 is then activated to lock the container in that orientation by engagement with protuberance 42, and the container is again rotated by the rotor for a period of about three to eight seconds. This rotation causes the supernatant plasma 46 to flow back through channel 18 and into chamber 6 by centrifugal draining, as illustrated in FIG. 4e. Thus, the fibrinogen pellet and plasma have now been separated. As a final step, the container is subjected to another centrifugation illustrated in FIG. 4f for about fifteen seconds, whereby the fibrinogen pellet is forced into the bottom of the chamber 8.

The automated process for production of fibrinogen is at this point complete, and the fibrinogen pellet is preferably extracted from the container 8 by a syringe for further processing. For example, the fibrinogen may be reconstituted and combined with thrombin to produce a sealant or an adhesive.

The apparatus of the invention may be used for other automated processes. For example, another technique for the separation of fibrinogen from blood in accordance with the structure of the invention uses cryoprecipitation. According to this technique, plasma is frozen to a temperature of about minus 20° C., thawed, and then centrifuged to separate the fibrinogen from plasma. The multiple-decanting apparatus of this invention may be used to automate cryoprecipitation by inclusion of a temperature control device 50 in thermal contact with the centrifuge. The temperature control device may comprise any of several known structures, including liquid nitrogen or liquid oxygen based devices and refrigeration devices.

To effect automated cryoprecipitation, a sample of blood is placed in the first chamber 8, and the container is then placed in the centrifuge and subjected to a first centrifugation. The plasma is then drained into the second chamber 8, for example by gravity draining. The temperature control device is then activated first to freeze the plasma and then to allow the plasma to thaw. The thawed plasma is subjected to a second centrifugation, which separates fibrinogen from the remainder of the plasma. The supernatant plasma is then separated from the fibrinogen by draining it back into the first chamber, for example by centrifugal draining, whereby only fibrinogen remains in the second chamber. The container is then removed from the centrifuge, and the fibrinogen removed from it for use as described above. Of course, the freeze-thaw-centrifuge process may be carded out any number of times before the supernatant is drained back into the first chamber.

Modifications within the scope of the appended claims will be apparent to those of skill in the art.

We claim:

1. A centrifuge comprising means for removably receiving a unitary container having a plurality of chambers for receiving substances to be centrifuged, means for rotating said container to subject said substances to centrifugation, and means for locking said container in a first predetermined position to allow a supernatant in a first of said chambers to transfer into a second of said chambers and for locking said container in a second position to transfer a supernatant in said second chamber to another of said chambers.

2. Apparatus according to claim 1 wherein said means for locking, when activated, locks said container such that a supernatant in one of said chambers transfers into another of said chambers by gravity draining.

3. Apparatus according to claim 1 wherein said means for locking, when activated, locks said container such that a supernatant in one of said chambers transfers into another of said chambers by centrifugal transferring.

4. Apparatus according to claim 1 wherein said means for locking, when activated to a first position, locks said container such that a supernatant in said first chamber drains into said second chamber by gravity draining and, when activated to a second position, locks said container such that a supernatant in said second chamber transfers into said first chamber by centrifugal transferring.

5. Apparatus according to claim 1 wherein said locking means comprises a movable plate and means for controlling the position of said plate.

6. Apparatus according to claim 5 wherein means for controlling is electrical.

7. Apparatus according to claim 6 wherein said means for controlling is magnetic.

8. Apparatus according to claim 1 further comprising means for controlling said means for locking and said means for rotating to provide automatic multiple decanting by activating said means for rotating for a predetermined period of time, activating said means for locking to allow a supernatant in said first chamber to transfer into said second chamber, activating said means for rotating a second time, and activating said means for locking a second time to allow a supernatant in said second chamber to transfer into said first chamber.

9. Apparatus according to claim 8 wherein said means for locking locks said container such that a supernatant in said first chamber transfers into said second chamber by gravity draining and locks said container such that a supernatant in said second chamber transfers into said first chamber by centrifugal transferring.

10. Apparatus according to claim 1 further comprising means for controlling the temperature of the contents of said second chamber.

11. Apparatus according to claim 10 wherein said means for controlling the temperature is capable of freezing said contents for cryoprecipitation.

12. Apparatus for separation of a precipitate from a liquid comprising a unitary container having first and second adjacent chambers, wherein said first chamber is located with respect to said second chamber such that a first supernatant in said first chamber drains by gravity into said second chamber when said first and second chambers are held in a first orientation and a second supernatant in said second chamber transfers from said second chamber into said first chamber by centrifugal transferring when said first and second chambers are held in a second orientation and subjected to centrifugation.

13. Apparatus according to claim 12 wherein said first and second chambers are joined by a wall that forms a fluid flow path between said first and second chambers.

14. Apparatus according to claim 13 further comprising divider means for dividing said first chamber into two [pads] *parts*, said divider means being located near the expected location of the interface between said precipitate and said liquid.

15. Apparatus according to claim 14 wherein said divider means includes a periphery having at least one groove therein for allowing fluid communication between said two parts.

16. Apparatus according to claim 12 further comprising a covering on said first and second chambers for preventing spillage of the contents of said chambers while allowing a syringe to inject fluids into or remove fluids from said chambers.

17. Apparatus according to claim 16 wherein said covering includes access port means for each of said chambers for allowing a fluid to be introduced into a chamber and means for sealing said access port means until opened to allow said fluid to pass.

18. Apparatus according to claim 17 wherein at least one of said chambers includes a hollow tube aligned with a said access port for conducting said fluid into said at least one of said chambers.

19. Apparatus according to claim 18 further comprising air vent means for allowing air in said container to exit from said container.

20. Apparatus according to claim 12 in combination with a centrifuge for subjecting said liquid to centrifugation, locking said chambers in said first orientation to allow said first supernatant to drain into said second chamber, and locking said chambers in said second orientation while rotating said chambers to provide said centrifugal transferring.

21. A centrifuge comprising a first chamber for receiving a fluid substance and a second chamber for receiving a fluid substance, means for rotating said first and second chambers to subject said substances to centrifugation, and means for locking said chambers in first predetermined positions and for locking said chambers in second predetermined positions, means for transferring a supernatant in said first chamber into said second chamber by gravity when said chambers are in said first predetermined positions and for transferring a supernatant in said second chamber to said first chamber by centrifugal transfer when said chambers are in said second predetermined positions.

*22. A system for treating physiological products, comprising:*

*a centrifuge;*

*a container having at least a first chamber and an adjacent second chamber, wherein each of the first and second chambers has a top portion, a bottom portion and a set of walls, wherein the top portions of the first chamber and second chamber are adjacent each other and connected by a bridge that transfers fluid therebetween when said container is in a predetermined orientation; and*

*a holder assembly attached to the centrifuge and effective to removably receive the container and orient the container in said predetermined orientation.*

*23. The system of claim 22, wherein the chambers include removable lid portions, thereby forming a closed container.*

*24. The system of claim 23 wherein at least one of the chambers includes an access port for transference of a liquid.*

*25. A container comprising:*

*a first sterile chamber having a first top portion, a first bottom portion and a first set of walls;*

*a second sterile chamber adjacent said first sterile chamber and having a second top portion adjacent said first top portion, a second bottom portion and a second set of walls;*

*a bridge connecting said first top portion of the first chamber and said second top portion of the second chamber, such that a liquid can be transferred from the first chamber to the second chamber while the container is positioned at a predetermined angle, and*

*means for sterile transfer of a liquid to or from at least one of said chambers independently of the other of said chambers and located near the top of at least one of said chambers.*

*26. The container of claim 25, wherein the chambers include a removable lid portion.*

*27. A system for treating physiological products and maintaining sterility of said products during said treating comprising:*

*a container having a plurality of closed, sterile fluid-receiving chambers, a bridge forming a fluid path allowing fluid communication between a first of said chambers and a second of said chambers when said container is in a predetermined orientation, and at least one access port allowing sterile access to at least one of said chambers, and*

*a centrifuge having a holder removably receiving said container and allowing said container to assume a first orientation wherein a physiological product in one of said chambers is subjected to centrifugation and said predetermined orientation wherein fluid in said first of said chambers flows along said fluid path to said second of said chambers and said centrifuge comprises a locking element that selectively holds said container in said predetermined orientation.*

*28. A system according to claim 27 wherein said holder comprises a frame pivotally mounted to a rotor of said centrifuge.*

*29. A system according to claim 27 wherein said locking element comprises a movable locking plate that is movable between free and locking positions, wherein said plate allows said container to assume said first orientation when in said free position and holds said container in said predetermined position when in said locking position.*

*30. A system according to claim 29 further comprising an electromagnet for moving said locking plate to one of said locking and free positions.*

*31. A system according to claim 27 wherein said holder comprises a frame pivotally mounted to a rotor of said centrifuge, and said locking element comprises a movable locking plate that is movable between free and locking positions, wherein said movable locking plate engages said frame to allow said container to assume said first orientation when in said free position and to hold said container in said predetermined position when in said locking position.*

*32. A container comprising a base forming a plurality of sterile chambers, each of said chambers having a bottom and a top, a bridge connecting top portions of at least two of said chambers and arranged to provide a sterile fluid channel from a first of said at least two sterile chambers to a second of said at least two sterile chambers when said container is in a predetermined orientation, a lid closing said top of each of said plurality of chambers, and an access port near the top of at least one of said chambers forming an opening covered by an element that allows sterile transfer of a liquid through said opening to or from said at least one of said chambers independently of the other of said chambers.*

*33. A container according to claim 32 wherein said plurality of sterile chambers and said bridge comprise a molded base part.*

*34. A container according to claim 33 wherein said container is substantially rigid.*

*35. A container according to claim 32 further comprising a separation disk in one of said chambers.*

*36. A container according to claim 32 wherein said plurality of chambers comprise first and second adjacent chambers having adjacent sidewalls and said bridge is formed at the tops of said adjacent sidewalls.*

* * * * *